358-69. XR 3,737,563 SR

X6532
X6467

United States Patent [19]

Ketelaar

[11] 3,737,563

[45] June 5, 1973

[54] COLOR TELEVISION RECEIVER

[75] Inventor: Peter Ketelaar, Emmasingel, Eindhoven, Netherlands

[73] Assignee: U.S. Philips Corporation, New York, N.Y.

[22] Filed: July 14, 1971

[21] Appl. No.: 162,393

[30] Foreign Application Priority Data

July 28, 1970 Netherlands ......................7011112

[52] U.S. Cl. ...............................................178/5.4 R

[51] Int. Cl. ...............................................H04n 9/16

[58] Field of Search .........................178/5.4 R, 5.4 F, 178/5.4 H, 5.4 AC

[56] References Cited

UNITED STATES PATENTS

| | | | |
|---|---|---|---|
| 3,105,109 | 9/1963 | Macovski | 178/5.4 AC |
| 3,242,259 | 3/1966 | Keiper, Jr. | 178/5.4 F |
| 3,612,754 | 10/1971 | Altmanshafer | 178/5.4 R |

*Primary Examiner*—Richard Murray
*Attorney*—Frank R. Trifari

[57] ABSTRACT

A color television receiver including a display tube of the indexing type in which an increased contrast in case of monochrome display is obtained by changing the amplification of a luminance signal channel and optionally by reduction of the background luminance with the aid of a color killing circuit.

4 Claims, 1 Drawing Figure

PATENTED JUN 5 1973
3,737,563
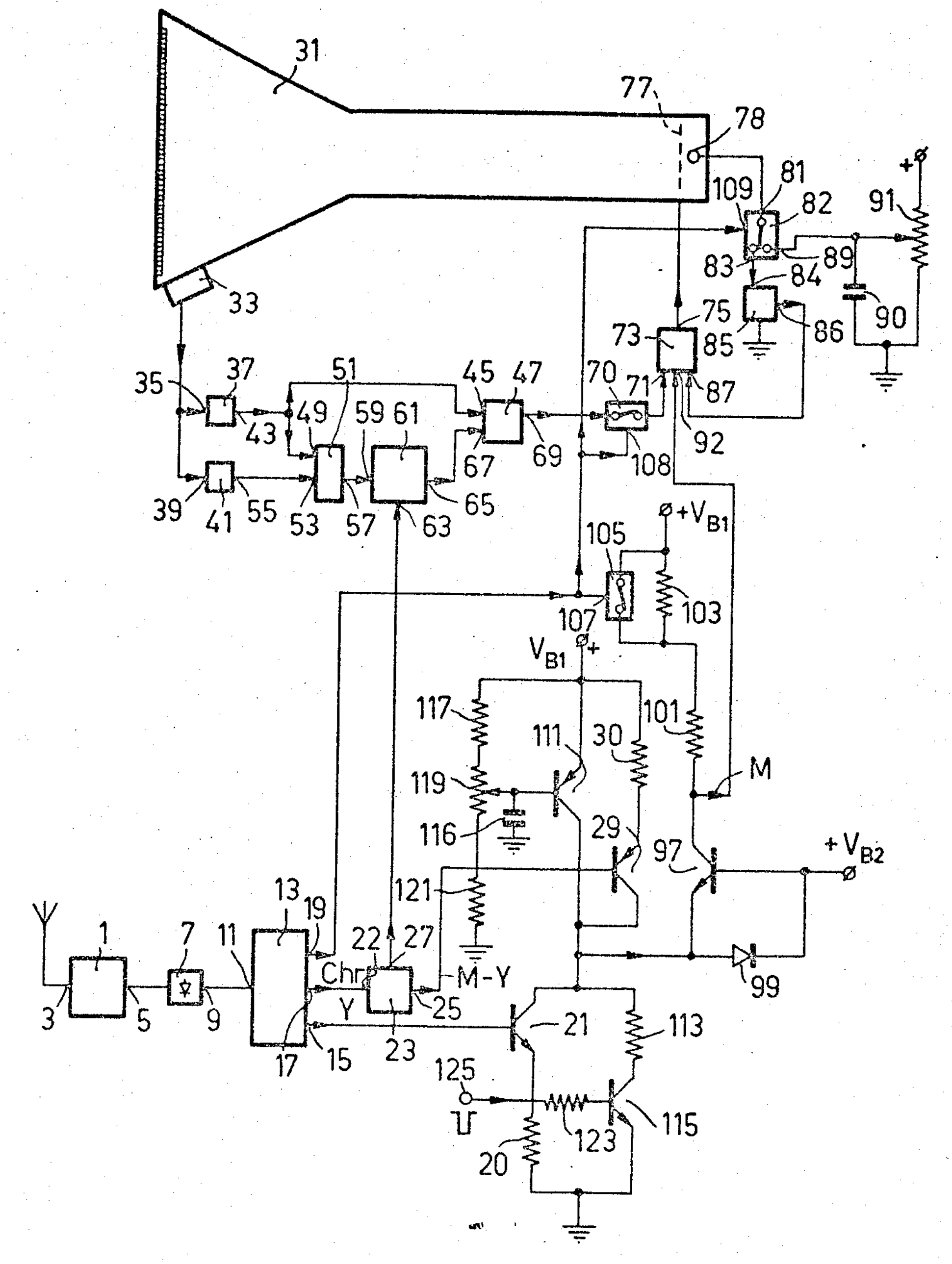
INVENTOR.
PETER KETELAAR
BY
AGENT

COLOR TELEVISION RECEIVER

The invention relates to a color television receiver including a picture display tube of the indexing type, a first channel through which at least a luminance signal is passed and a color information channel in which a carrier signal derived from a signal generator coupled to the picture display tube is phase-and amplitude-modulated by a color information signal combination, an output of each of these channels being coupled to a control electrode system of the picture display tube.

Color television receivers of the kind described above are known from the thesis of J.Davidse: "Transmission and decoding in color television".

The object of the present invention is to provide a further adaptation of such receivers to the standards generally applied for present-day color television receivers.

According to the invention a color television receiver of the kind described in the preamble is characterize in that the first channel includes a transmission factor change-over switch serving as a contrast change-over switch, an operation signal input of which is coupled to a color killing signal output of a chrominance sub-carrier reference signal detection circuit, so that a greater contrast is obtained upon monochrome display than upon color display.

It is achieved thereby that in case of monochrome display a more pleasant impression of the picture is gained than has been the case in the receivers of the kind described known so far.

It is to be noted that it is known from French Patent specification No. 1564066 to change the transmission factor of a red and a green color signal amplifier upon monochrome reception in a color television receiver for the purpose of changing over the white point so as to gain a more pleasant picture impression. However, it has been found that an increase of the contrast has a much more favorable effect and in color television receivers employing a display tube of the indexing type, which does not have any limitations relative to the permissible beam current, this is to be preferred to a change-over of the color point.

The increase of contrast in these receivers is furthermore a favorable possibility because no disturbing phenomena will occur in spite of a possible defocussing as a result thereof. This comparatively slight defocussing is not troublesome for the viewer of the monochrome picture, but it brings about a change in the indexing signal derived from the signal generator. This change might be impermissible for color display in such receivers. In case of monochrome display the change of the indexing signal as a result of defocussing is, however, not troublesome anyway because the indexing signal is not used for monochrome reception. The signal modulated by color information signals and derived from the indexing signal is zero in that case.

In order that the invention may be readily carried into effect, some embodiments thereof will now be described in detail, by way of example with reference to the accompanying diagrammatic drawing which includes a single FIGURE.

In the FIGURE a simplified block diagram represents a color television receiver according to the invention including a contrast change-over circuit illustrated by a simplified principle circuit diagram.

The color television receiver has an RF and IF section 1 and an input 3 to which a received signal is applied. An output 5 of the section 1 is connected to a detection circuit 7 an output 9 of which is connected to an input 11 of a separating circuit 13.

The separating circuit 13 has a first output 15 at which a luminance signal Y, a second output 17 at which a chrominance signal Chr in case of color reception and a third output 19 at which a color killing signal upon monochrome reception is produced. For obtaining the color killing signal the separating circuit 13 includes a conventional chrominance sub-carrier reference signal detection circuit which detects the possible presence of a chrominance signal. This detection circuit may be adapted to the system for which the receiver is designed and as is known to those skilled in the art it is generally different for NTSC, PAL and SECAM.

The first output 15 of the separating circuit 13 is connected to the base of a first npn transistor 21 the emitter of which is connected to earth through a resistor 20.

The second output 17 of the separating circuit 13 is connected to an input 22 of a decoding circuit 23. The decoding circuit 23 has a first output 25 at which in case of color reception a luminance correction signal M – Y is produced and a generally multiple second output 27 at which in case of color reception a combination of a reference carrier and an adapted chrominance signal or a combination of demodulated color difference signals is produced dependent of the fact whether a conversion system or a demodulation-remodulation system is used for adapting the chrominance signal to the requirements to be imposed for the display on an indexing tube.

The first output 25 of the decoding circuit 23 is connected to the base of a second pnp-transistor 29 the emitter of which is connected through a resistor 30 to a positive voltage supply $+V_{B_{1-11}}$ and the collector of which is connected to the collector of the first transistor 21.

The receiver furthermore includes a picture display tube of the indexing type to which a signal generator 33 is coupled. The signal generator 33 is generally a photomultiplier tube sensitive to ultraviolet light, but may in principle by any usable circuit which provides a signal, referred to as indexing signal, dependent on the electron beam spot on the screen of the display tube 31.

The signal generator 33 is connected to an input 35 of an indexing signal amplifier 37 and to an input 39 of a run-in signal amplifier 41. An output 43 of the indexing signal amplifier 37 is connected to an input 45 of a mixer circuit 47 and to an input 49 of a frequency divider circuit 51. A further input 53 of the frequency divider circuit 51 is connected to an output 55 of the run-in signal amplifier 41 for obtaining the correct phase in case of a frequency division in the divider circuit 51.

An output 57 of the frequency divider circuit 51 is connected to an input 59 of a modulation circuit 61, an input combination 63 of which is furthermore connected to the second output of output combination 27 of the decoding circuit 23.

An output 65 of the modulation circuit 61 is connected to a further input 67 of the mixer circuit 47. A carrier modulated in phase and amplitude by color difference signals is obtained along this path at a writing frequency which in its reference phase and frequency is coupled to the position or scanning rate of the electron beam on the screen of the display tube 31. This modulated signal is brought to a frequency required for a correct display with the aid of the signal applied to the input 45 in the mixer circuit 47, and becomes available at an output 69 of the mixer circuit 47.

The output 69 of the mixer circuit 47 is connected through a color killing switch 70 to a first input 71 of a combination circuit 73, an output 75 of which circuit 73 is connected to a Wehnelt electrode 77 of the picture display tube 31.

Furthermore a cathode 78 of the picture display tube 31 is connected to an input 81 of a luminance change-over switch 82. A connection 83 of the luminance change-over switch 82 is connected to an input 84 of a beam current measuring circuit 85. The beam current measuring circuit 85 provides a control magnitude for an output 86, which control magnitude is dependent on the background beam current which is the minimum beam current occurring. The output 86 of the beam current measuring circuit 85 is connected to a second input 87 of the combination circuit 73. A further connection 89 of the luminance change-over switch 82 is connected to an adjustable tap, bypassed by a capacitor 90, on a potential divider 91 arranged between a positive voltage supply and earth.

A third input 92 of the combination circuit 73 is connected to the collector of a third npn transistor 97.

The base of the third transistor 97 is connected to a positive voltage supply $+V_{B_{2+II}}$ and the emitter is connected to the collectors of the first and second transistors 21 and 29. The emitter-base junction thereof is shunted by a diode 99 conducting in a direction from the emitter to the base. The collector of the third transistor 97 is connected to the positive voltage supply $+V_{B_{1+II}}$ through a series arrangement of two resistors 101 and 103.

A contrast change-over switch 105 is arranged in parallel with the resistor 103, an operation signal input 107 of said switch being connected to the third output 19 of the separating circuit 13. This third output 19 of the separating circuit 13 is furthermore connected to operation signal inputs 108 and 109 of the color killing switch 70 and the luminance change-over switch 82, respectively.

The interconnection of the collectors of the first and second transistors 21 and 29 and the emitter of the third transistor 97 is furthermore connected to the collector of a fourth npn transistor 111 and to the collector of a fifth npn transistor 115 through a resistor 113.

The emitter of the fourth transistor 111 is connected to the voltage supply $+V_{B_{1+II}}$ and the base is connected to a tap, bypassed by a capacitor 116, on a potential divider constituted by a series arrangement of resistors 117, 119 and 121 between the voltage supply $+V_{B_{1+II}}$ and earth.

The emitter of the fifth transistor 115 is connected to earth and the base is connected through a resistor 123 to a black level pulse input 125 to which a negative pulse occurring during the flyback periods is applied.

The operation of the circuit arrangement in so far as it is important for the understanding of the invention will now be further described.

The position shown of the switches 70, 82 and 105 is the position occurring in case of color television reception The first and second transistors 21 and 29 are controlled by a luminance signal Y and a luminance correction signal M − Y, respectively, and apply a corrected luminance signal M to their interconnected collectors, which luminance signal is applied to the emitter of the third transistor 97 and produces a luminance signal current at the collector of this third transistor 97 producing a signal voltage across the series arrangement of resistors 101 and 103, which signal voltage depends on the magnitude of the resistance of this series arrangement. This signal voltage is applied to the third input 92 of the combination circuit 73 and is passed on through this combination circuit 73 to the Wehnelt electrode 77 of the picture display tube 31. Upon reception of a color television signal at the first input 71 in the combination circuit 73 the adapted carrier to be displayed and modulated by color information signals and applied through the then closed switch 70 is added to the corrected luminance signal M and furthermore a control voltage is applied to the second input 87 so as to maintain the minimum beam current at a constant value.

When a color television signal is received the voltage at the operation signal input 107 of the contrast change-over switch 105 is such that the resistor 103 is short-circuited. The collector resistor of the third transistor 97 is then only constituted by the resistor 101. When a monochrome television signal is received, the voltage at the operation signal input 107 of the contrast change-over switch 105 is such that the resistor 103 is no longer shunted by this switch 105 and the load resistor of the third transistor 97 is constituted by the resistors 101 and 103 in series. The signal voltage at the collector of this transistor 97 will thus increase in that case because the third transistor 97 is a current source whose luminance signal control does not change. The increase in the signal voltage in case of monochrome reception as compared with that for color reception results in an increase of the contrast. This is found to have a more favorable effect on the viewer than a color point change-over as is conventional in television receivers employing shadow mask display tubes.

In addition to a luminance signal current a direct current is applied to the emitter of the third transistor 97 by which direct current the background luminance, that is to say, the luminance of the darkest picture parts is relatively influenced most. This direct current is the difference between current flowing through the fifth transistor 115 and an adjustable current flowing through the fourth transistor 111 whose base receives an adjustable voltage serving for the luminance adjustment and obtained from the tap on the series arrangement of resistors 117, 119 and 121 from the supply source $+V_{B_{1+II}}$. The current flowing through the fifth transistor 115 is blocked during the blanking periods so that the third transistor 97 is also cut off. As a result a constant black level which serves for the control of the beam current occurs during these blanking periods in the output signal of the third transistor 97.

In case of color television reception a negative feedback loop is present for the direct current for this control, which direct current flows from the second input 87 through the combination circuit 73, the Wehnelt cathode range of the picture display tube 31, the change-over switch 82 and the beam current measuring circuit 85 back to the second input 87 of the combination circuit 73. This negative feedback attempts to maintain the minimum beam-current flowing through the display tube 31 substantially constant. In case of monochrome reception this negative feedback loop is interrupted by the luminance change-over switch 82 and a direct voltage is applied to the cathode of the display tube 31 such that the background luminance is slighter than in case of color reception so that the contrast is still more increased. This voltage is obtained through the connection 89 of the change-over switch 82 which is then in a position not shown from the adjustable tap on the resistor 91.

The diode 99 has the function to remove possibly occurring signal currents which corresponds to blacker than black.

It will be evident that the amplification of the luminance signal channel may alternatively be changed in different manners by the contrast change-over switch 105 such as, for example, by changing a negative feedback, by changing over to a different number of active elements or by changing the amplification of an active element.

The luminance change-over switch 82, the contrast change-over switch 105 and the color killing switch 72 may be formed, for example, as relay contacts of one or more relays or as transistor or diode switches.

Furthermore, the background luminance may be changed, for example, by influencing the clamping level in the beam current clamping control system of the embodiment. When using, for example, a different clamping circuit without a control system, a clamping level may optionally be adapted for the change-over of the background luminance while furthermore the direct current level of the video signal may be corrected in one way or other optionally independently of a clamping circuit.

The manner in which a carrier-modulated color information signal adapted for display on an indexing tube is obtained is not important for the invention. In addition to the described methods of producing this modulation by means of demodulated or undemodulated color difference signals, it is possible to constitute first color signals R, G and B by combining the demodulated color difference signals with the uncorrected luminance signal Y whereafter these color signals may be made dot-sequential and may be brought to the desired writing frequency.

Although in the above-mentioned embodiment for the change-over of the contrast the transmission factor of a video section of the receiver was changed, it is of course alternatively possible to influence the transmission factor of an RF or IF section of the receiver. This is then to be effected in such a manner that a possible automatic gain control does not eliminate this influence.

What is claimed is:

1. A color television receiver including a picture display tube of the indexing type, a first channel through which at least a luminance signal is passed and a color information channel in which a carrier signal derived from a signal generator coupled to the picture display tube is phase and amplitude-modulated by a color information signal combination, an output of each of said channels being coupled to a control electrode system of the picture display tube, characterized in that the first channel includes a transmission factor change-over switch serving as a contrast change-over switch an operation signal input of which is coupled to a color killing signal output of a chrominance subcarrier reference signal detection circuit, so that a greater contrast is obtained upon monochrome display than upon color display.

2. A color television receiver as claimed in claim 1, characterized in that the transmission factor change-over switch is incorporated in a video section of the receiver.

3. A color television receiver as claimed in claim 2, characterized in that the transmission factor change-over switch includes a current source circuit at least controlled by a luminance signal and having a load resistor and means for changing the value of said load resistor depending upon whether color or monochrome signals are being received.

4. A color television receiver as claimed in claim 1, characterized in that it includes a background luminance change-over switch which can be operated by the color killing signal so as to reduce the background luminance for monochrome display relative to that for color display.

* * * * *